3,338,892
STEROIDAL CARBAMIC ACID-γ-LACTONES
Eugene Farkas, Indianapolis, Ind., assignor to Eli Lilly and Company, Indianapolis, Ind., a corporation of Indiana
No Drawing. Filed Nov. 24, 1964, Ser. No. 413,642
4 Claims. (Cl. 260—239.55)

This invention relates to a novel group of steroidal carbamic acid-γ-lactones and to intermediates useful in their synthesis.

The compounds provided by this invention can be represented by the following formula:

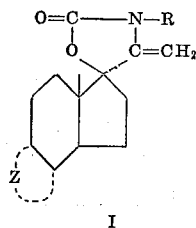

I wherein R is a $C_1$–$C_5$ alkyl group and Z is selected from the group consisitng of

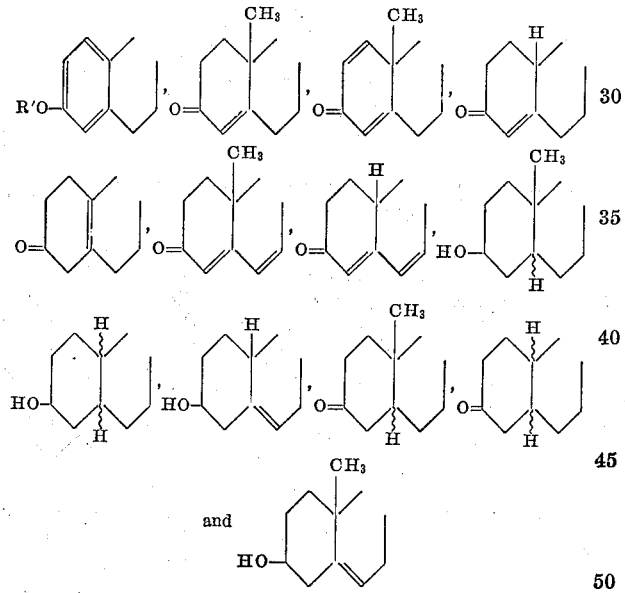

and wherein R' is hydrogen or $C_1$–$C_3$ alkyl, and a wavy line indicates that the hydrogen at that position of the steroid ring can be either alpha or beta.

When R is a $C_1$–$C_5$ alkyl group, it can be, illustratively, methyl, ethyl, n-propyl, isopropyl, n-butyl, sec.-butyl, isobutyl, t-butyl, 1-pentyl, 2-pentyl, 3-pentyl, neopentyl, t-amyl, 3-methyl-2-butyl, isoamyl and the like. Where R' is $C_1$–$C_3$ alkyl, it can be methyl, ethyl, n-propyl or isopropyl.

Illustrative compounds coming within the scope of the Formula I above include:

2'-oxo-3-hydroxy-3'-(2-pentyl)-4'-methylenespiro-
 [1,3,5(10)-estratriene-5',17-oxazolidine]

2',3-dioxo-3'-isobutyl-4'-methylenespiro-[4-androsten-
 5',17-oxazolidine]

2',3'-dioxo-3'-isopropyl-4'-methylenespiro-[2,4-androsta-
 dien-5',17-oxazolidine]

2',3-dioxo-3'-t-amyl-4'-methylenespiro-[4-estren-5',17-
 oxazolidine]

2'-oxo-3-n-propoxy-3'-t-butyl-4'-methylenespiro-[1,3,5
 (10)-estratriene-5',17-oxazolidine]

2',3-dioxo-3'-(3-methyl-2-butyl)-4'-methylenespiro-
 [5(10)-estren-5',17-oxazolidine]

2',3-dioxo-3'-(1-pentyl)-4'-methylenespiro-[4,6-androsta-
 dien-5',17-oxazolidine]

2',3-dioxo-3'-(sec.-butyl)-4'-methylenespiro-[4,6-estra-
 dien-5',17-oxazolidine]

2'-oxo-3-hydroxy-3'-(3-pentyl)-4'-methylenespiro-[5α-
 androstan-5',17-oxazolidine]

2'-oxo-3-hydroxy-3'-methyl-4'-methylenespiro-[5α,10α-
 estran-5',17-oxazolidine]

2'-oxo-3-hydroxy-3'-ethyl-4'-methylenespiro-[5-andro-
 sten-5',17-oxazolidine]

2',3-dioxo-3'-neopentyl-4'-methylenespiro-[5α-androstan-
 5',17-oxazolidine]

2',3-dioxo-3'-isoamyl-4'-methylenespiro-[5α,10α-estran-
 5',17-oxazolidine]

2'-oxo-3-hydroxy-3'-n-propyl-4'-methylenespiro-[10β-
 estr-5-en-5',17-oxazolidine].

Compounds represented by the above formula are prepared according to the following reaction sequence:

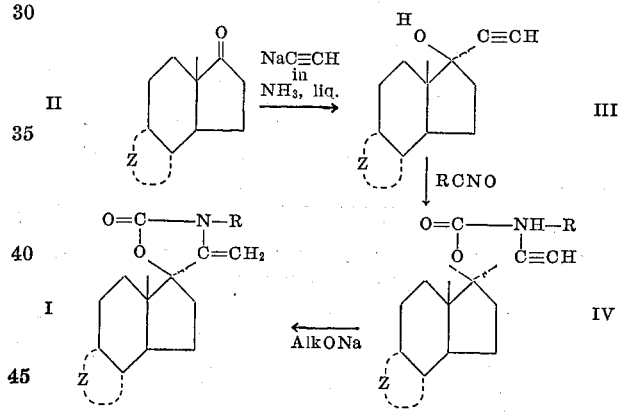

wherein R and Z have the same meaning as hereinabove. According to the above reaction sequence, a $C_{19}$ steroid (II) having a ketone group at 17 is reacted with sodium acetylide to yield the corresponding 17α-ethinyl-17β-hydroxy compound (III). Reaction of this acetylenic alcohol with an alkyl isocyanate (RCNO) yields, as a major product, the carbamate ester of the 17-hydroxy group (IV), which ester is purified by chromatography. Treatment of this ester with base, as for example, sodium methoxide, yields directly the desired steroid carbamic acid-γ-lactone (I).

The compounds of this invention have hormonal action. For example, the carbamic acid-γ-lactone derived from 3-methoxyestrone is a potent estrogenic agent, and the carbamic acid-γ-lactones derived from 4-androstene-3,17-dione and from 19-nor-4-androstene-3,17-dione have progestational activity. In particular, 2',3-dioxo-3'-methyl-4'-methylenespiro-[4-estren - 5',17 - oxazolidine] shows con-

3 siderably greater progestational activity than 17α-ethinyl-19-nortestosterone, when administered by parenteral injection.

The intermediate steroid carbamate esters represented by Formula IV above also are novel compounds and, as such, form a second aspect of this invention. The compounds are, of course, useful as intermediates, and also, in certain instances, exert a hormonal action, specifically, an estrogenic action, when administered to suitable laboratory animals.

This invention is further illustrated by the following specific examples:

EXAMPLE I

*2'-oxo-3-methoxy-3'-ethyl-4'-methylenespiro-[1,3,5 (10)-estratrien-5',17-oxazolidine]*

Two grams of 3-methoxy-17α-ethinylestradiol, 23 ml. of ethyl isocyanate and .15 g. of triethylenediamine were mixed, and the mixture heated at reflux temperature for about three days. An additional 5 ml. of ethyl isocyanate were added after one day. The volatile constituents were removed from the reaction mixture by evaporation in vacuo. The resulting residue was disssolved in benzene and chromatographed over 75 g. of neutral alumina. N,N'-diethyl-3-methoxy-17α - ethinylestradiol carbamoylcarbamate, a by-product in the above reaction, was eluted from the column with a 1:10 ether-benzene solvent mixture. Further development of the chromatogram with 1:3 and 1:1 ether-benzene eluants yielded N-ethyl-3-methoxy-17α-ethinylestradiol carbamate upon evaporation of the eluting solvent. The compound was recrystallized from methanol: M.P.=89–91° C. Analysis, Calc.: C, 75.55; H, 8.19; N, 3.67. Found: C, 75.28; H, 8.14; N, 3.57.

A solution of sodium methoxide in methanol was prepared by adding 0.05 g. of sodium to 5 ml. of methanol. A solution containing 0.2 g. of N-ethyl-3-methoxy-17α-ethinylestradiol carbamate, prepared as specified above, in 17 ml. of reagent methanol was added, and the mixture was heated to reflux temperature for about fourteen hours. The methanol was partially removed by evaporation in vacuo, and the remaining concentrate was poured into a large volume of water. Extraction of the aqueous phase with ether yielded 2'-oxo-3-methoxy-3'-ethyl-4' - methylenespiro - [1,3,5(10) - estratrien - 5',17-oxazolidine] which melted at about 148–149° C. after recrystallization from methanol. Analysis, Calc.: C, 75.55; H, 8.19; N, 3.67. Found: C, 75.52; H, 8.38; N, 3.48.

EXAMPLE II

*2',3-dioxo-3'-n-propyl-4'-methylenespiro-[4-androsten-5',17-oxazolidine]*

Following the procedure of Example I, 17α-ethinyl-4-androsten-17β-ol-3-one and n-propyl isocyanate were heated at reflux temperature for about five days in the presence of a catalytic quantity of triethylenediamine. The volatile constitutents were evaporated in vacuo, and the residue was dissolved in a benzene-pentane solvent mixture and chromatographed over neutral alumina. N-n-propyl-17α-ethinyl - 4 - androsten - 17β - ol -3 - one carbamate was eluted when the eluant was changed from benzene-pentane to pure benzene and was obtained as a solid by evaporation of the eluting solvent. Recrystallization of N-n-propyl-17α-ethyl-4-androsten-17β - ol - 3 - one carbamate, employing an ether-pentene solvent mixture, yielded the compound in purified form: M.P. =184–185° C.

Still following the procedure of Example I, the above carbamate was heated to reflux temperature in methanol solution in the presence of sodium methoxide, thus forming 2',3-dioxo-3'-n-proyl-4'-methylenespiro-[4-androsten-5',17-oxazolidine], melting at about 197–199° C. after recrystallization from ether. Analysis, Calc.: C, 75.52; H, 8.87; N, 3.52. Found: C, 75.43; H, 8.90; N, 3.28.

EXAMPLE III

*2',3-dioxo-3'-methyl-4'-methylenespiro-[4-estren-5',17-oxazolidine]*

Following the procedure of Example I, 17α-ethinyl-4-estren-17β-ol-3-one and methyl isocyanate were heated at reflux temperature for about two days in the presence of a catalytic quantity of triethylenediamine. Evaporation of the volatile constituents in vacuo and chromatography of the resulting residue over neutral alumina, using a 4:3 chloroform-ether solvent mixture as the eluant, yielded N-methyl-17α-ethinyl-4-estren-17β - ol - 3- one carbamate. Recrystallization of the solids obtained from these 4:3 chloroform-ether eluant fractions yielded pure N-methyl-17α-ethinyl - 4 - estren - 17β - ol - 3 - one carbamate melting at about 130–132° C. after recrystallization from ether. Analysis, Calc.: C, 74.33; H, 8.22; N, 3.94. Found: C, 74.21; H, 8.33; N, 4.22.

Still following the procedure of Example I, heating a mixture of the above carbamate and sodium methoxide in methanol yielded 2',3-dioxo-3'-methyl - 4' - methylenespiro - [4-estren - 5',17 - oxazolidine] melting at about 189–190° C. after recrystallization from a methanol-water solvent mixture. Analysis, Calc.: C, 74.33; H, 8.22; N, 3.94. Found: C, 74.29; H, 8.34; N, 3.93.

2',3-dioxo-3-ethyl-4'-methylenespiro-[4 - estren - 5',17-oxazolidine] was obtained by substituting ethyl isocyanate for methyl isocyanate in the above procedure. The compound melted at about 187–189° C. after recrystallization from ether. Analysis, Calc.: C, 74.76; H, 8.45; N, 3.79. Found: C. 74.78; H, 8.51; N, 3.88.

I claim:
1. A compound of the formula

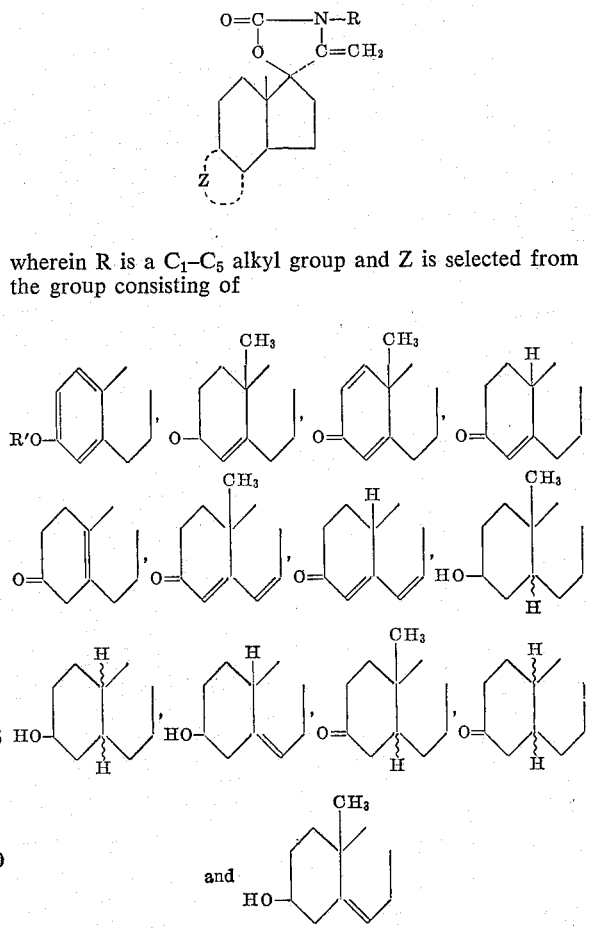

wherein R is a $C_1$–$C_5$ alkyl group and Z is selected from the group consisting of wherein R' is a member of the group consisting of hydrogen and $C_1$–$C_3$ alkyl, and a wavy line indicates that the hydrogen at that position of the steroid ring can be either alpha or beta.

2. 2'-oxo-3-methoxy - 3' - ethyl - 4' - methylenespiro-[1,3,5(10)-estratrien-5',17-oxazolidine].

3. 2',3-dioxo-3' - n - propyl - 4' - methylenespiro - [4-androsten-5',17-oxazolidine].

4. 2',3-dioxo-3'-methyl-4'-methylenespiro - [4 - estren-5',17-oxazolidine].

References Cited

UNITED STATES PATENTS 2,885,413   5/1959   Hogg et al. _____ 260—397.45

OTHER REFERENCES

Fieser et al., "Steroids" (1959), Reinhold Publishing Corp., New York, pages 590–595.

ELBERT L. ROBERTS, *Primary Examiner.*